United States Patent
Moritz et al.

[11] Patent Number: 5,920,164
[45] Date of Patent: Jul. 6, 1999

[54] BRUSHLESS LINEAR MOTOR

[75] Inventors: Frederick G. Moritz, Hauppauge; Roger Mosciatti, Coram, both of N.Y.

[73] Assignee: MFM Technology, Inc., Ronkonkoma, N.Y.

[21] Appl. No.: 08/943,005

[22] Filed: Oct. 2, 1997

Related U.S. Application Data

[63] Continuation-in-part of application No. 08/742,821, Oct. 31, 1996, Pat. No. 5,773,941.

[51] Int. Cl.$^6$ .............................. H02P 6/02; H02K 29/08
[52] U.S. Cl. ........................... 318/254; 318/138; 318/439
[58] Field of Search ..................................... 318/135, 254, 318/138, 439, 139, 685, 599, 110, 115; 388/812, 800, 816; 355/27; 354/319; 396/612; 414/712, 732

[56] References Cited

U.S. PATENT DOCUMENTS

| | | |
|---|---|---|
| 4,151,447 | 4/1979 | von der Heide et al. . |
| 4,560,911 | 12/1985 | Chitayat . |
| 4,595,870 | 6/1986 | Chitayat . |
| 4,625,132 | 11/1986 | Chitayat . |
| 4,733,143 | 3/1988 | Chitayat . |
| 4,749,921 | 6/1988 | Chitayat . |
| 4,761,573 | 8/1988 | Chitayat . |
| 4,798,985 | 1/1989 | Chitayat . |
| 4,812,725 | 3/1989 | Chitayat . |
| 4,834,353 | 5/1989 | Chitayat . |
| 4,839,545 | 6/1989 | Chitayat . |
| 5,317,245 | 5/1994 | Moritz et al. ............................ 318/254 |
| 5,844,662 | 12/1998 | Akimoto et al. ........................... 355/27 |

FOREIGN PATENT DOCUMENTS 290354  6/1965  Netherlands .

*Primary Examiner*—Paul Ip
*Attorney, Agent, or Firm*—Lane, Aitken & McCann

[57] ABSTRACT

The armature coils of a brushless linear motor are cast in resin to form an armature plate. A heat sink is attached along one edge of the plate with conductive pins (e.g. aluminum pins) extending through the plate and into the heat sink. Fans, attached to the heat sink, draw air across it in order to remove heat by convection. A wireless communications link transmits commutation data and/or armature position data to a motor controller.

17 Claims, 7 Drawing Sheets ns, the fans may be powered from the same two or three wires that power the armature coils. Power to the fans and resultant fan speed is automatically proportional to armature current and the fan need not be powered when the armature is at rest.

BRUSHLESS LINEAR MOTOR

RELATED APPLICATIONS

This application is a continuation in part of U.S. application Ser. No. 08/742,821, filed Oct. 31, 1996, now U.S. Pat. No. 5,317,245.

BACKGROUND OF THE INVENTION

1. Field of the Invention

This invention relates to improvements in brushless, linear motors.

2. Description of the Prior Art

As will be appreciated by those skilled in the art, there is a growing commercial use of high performance, brushless linear motors in various applications. One recognized disadvantage of prior art brushless motors is the cumbersome umbilical wires that connect the moving armature (also referred to in the linear motor art as the slider) to the controller and power source. For example, the umbilical for a prior art three-phase, brushless motor has three power lines, five signal lines for the armature commutating signals, and eight signal lines for armature position signals. Another disadvantage is the need to remove heat from the moving armature. Where a coolant is used, the umbilical includes, in addition to the wires, a tube to carry the coolant to a coolant coil embedded in the armature and a tube to carry the coolant from the coil. The result is a heavy, cumbersome, umbilical of wires and tubes, festooned along the path in which the armature moves.

SUMMARY OF THE INVENTION

An object of this invention is the provision of a brushless, linear motor with a small number of umbilical wires.

Another object of this invention is the provision of a brushless, linear motor with a thermally efficient armature cooling system that eliminates the need for coolant coils.

A further object of the invention is the provision of an improved armature coil and a method of making the armature coil.

Briefly, this invention contemplates the provision of a brushless, linear motor in which the armature coils are cast in a resin to form an armature plate. A heat sink is attached along one edge of the plate with conductive pins (e.g. aluminum pins) extending through the plate and into the heat sink. Fans, attached to the heat sink, draw air across it in order to remove heat by convection. A wireless communications link transmits commutation data and/or armature position data to a motor controller.

In one embodiment of the invention, a rectangular wire is used to wind each individual coil. Adjacent coils may be partially overlapped, or not overlapped, as desired. A printed circuit board interconnects the armature coils and connects them to the external power wires. The form on which the coils are wound can be used to support the coils during their encapsulation.

Power to the armature coils can be implemented by a six-step, two wire system with auxiliary power for the electronics provided as taught in U.S. Pat. No. 5,317,245, or as taught in the 08/742,821 application both of which are incorporated herein by reference. Alternatively, a three-wire, three-phase, sinusoidal armature drive may be used as auxiliary electronics power again provided as taught in U.S. Pat. No. 5,317,245 or application Ser. No. 08/742,821. In either the two wire six-step or three wire, three phase systems, the fans may be powered from the same two or three wires that power the armature coils. Power to the fans and resultant fan speed is automatically proportional to armature current and the fan need not be powered when the armature is at rest.

In the three-phase embodiment of the invention, control amplifiers located remotely from the motor generate a three-phase, sinusoidal armature drive signal, which is controlled in response to the armature commutation and armature position signals. Only three wires are used in the umbilical to couple both the three-phase drive current to the armature coils and to couple, through a d.c. to d.c. convertor, current to power the fans.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
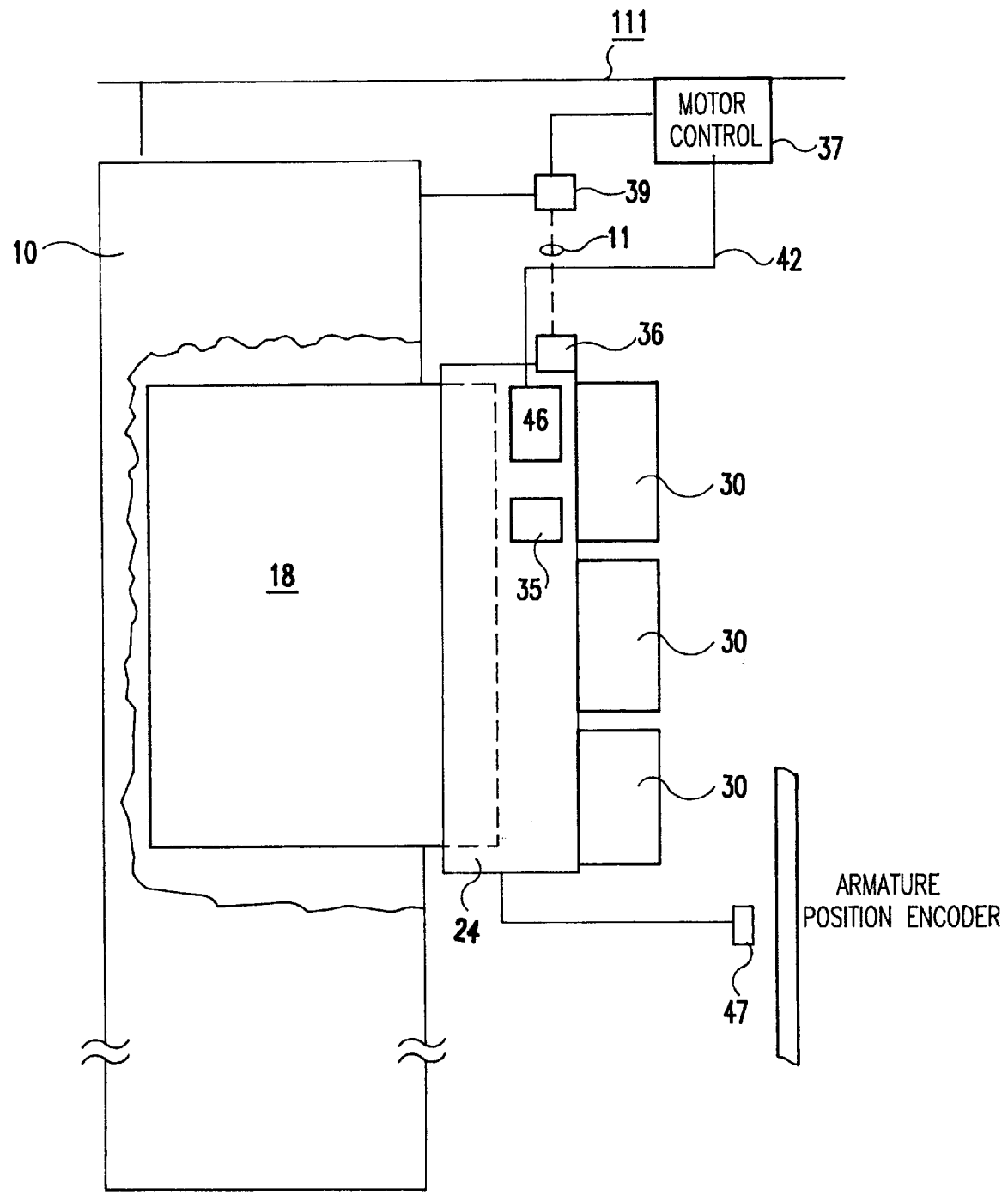
FIG. 1 is a schematic plan view, with parts broken away, of one embodiment of a brushless, linear motor in accordance with the teachings of this invention.
Figure 2:
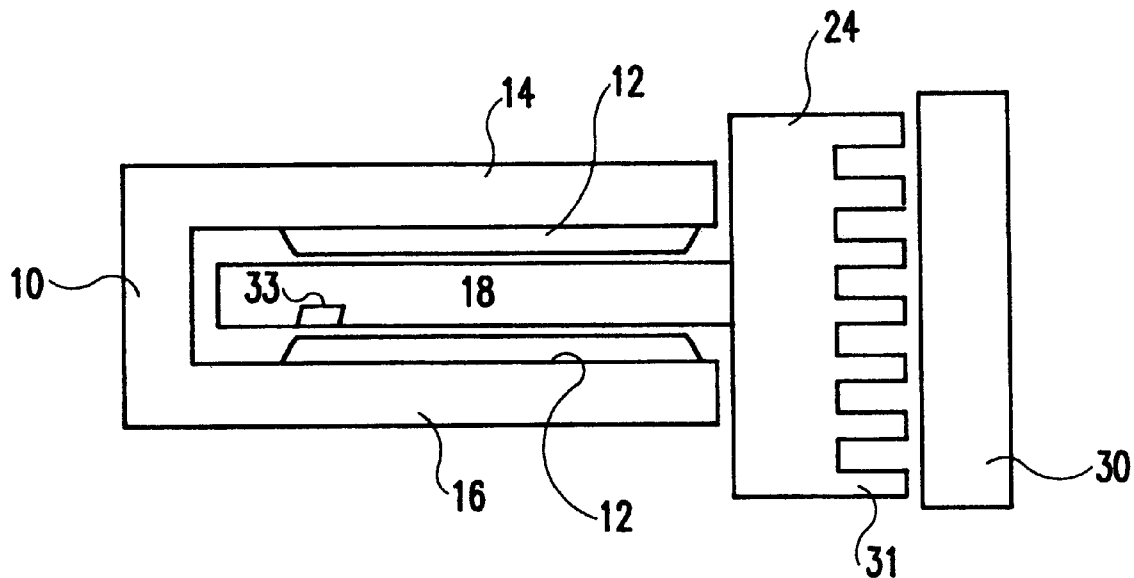
FIG. 2 is a partial end view of the motor shown in FIG. 1.
Figure 3:
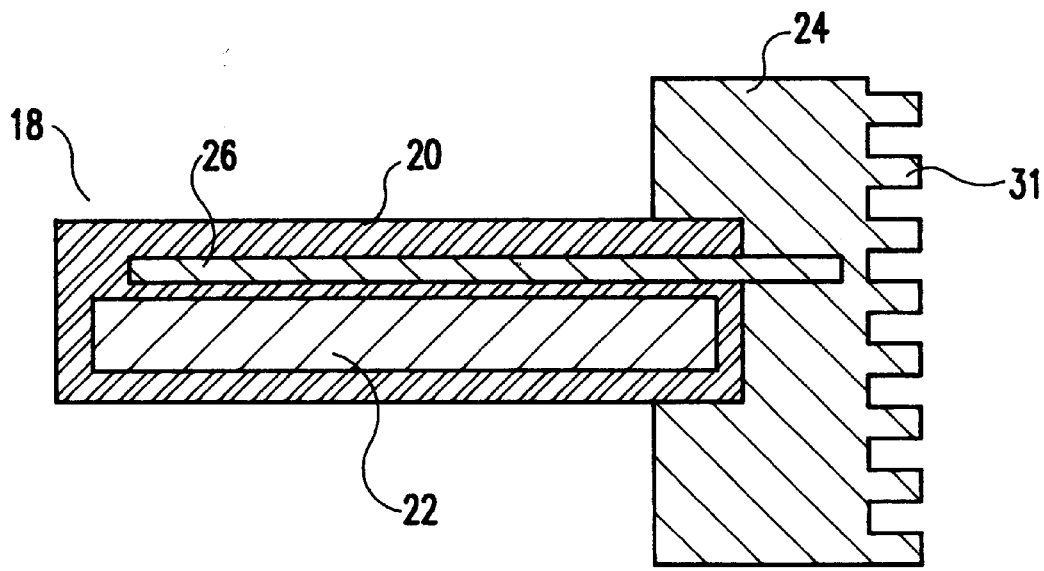
FIG. 3 is a partial sectional view of the armature and heat sinks shown in FIGS. 1 and 2.

Referring now to FIGS. 1, 2, 3, 4 and 5, the brushless, linear motor, in this illustrative embodiment of the invention, has a U-shaped stator 10. A series of permanent magnets 12 are attached to a top arm 14 and a bottom arm 16 of the stator 10. An armature 18 (also referred to in the linear motor art as a slider) is adapted to move back and forth in the space between the magnets 12 and is mechanically supported by any one of a number of suitable prior art structures (not shown). As will be appreciated by those of ordinary skill in the art, the linear motor thus far described is representative of prior art brushless, permanent magnet linear motors.

Figure 4:
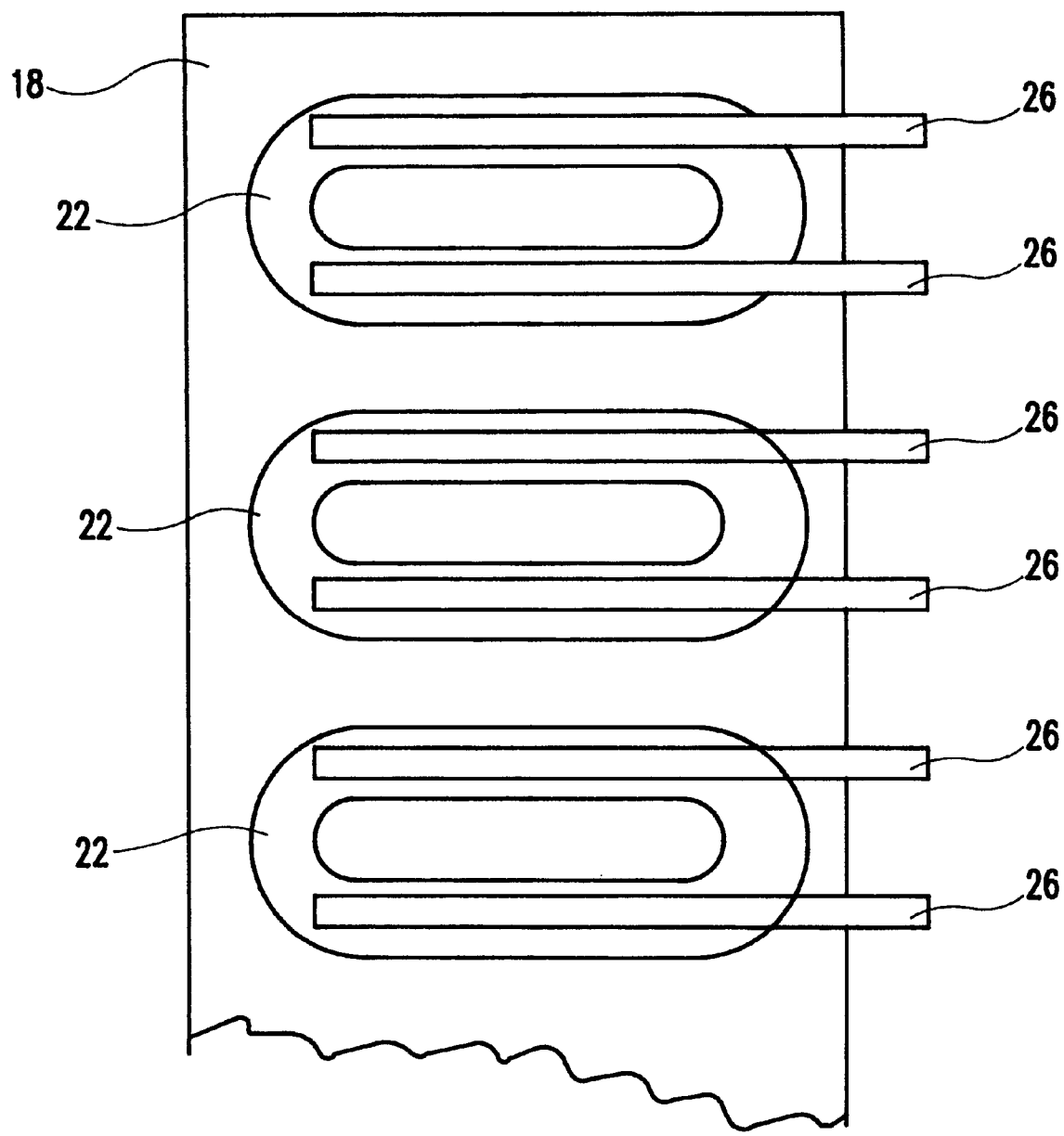
FIG. 4 is a plan view of the slider shown in FIGS. 1, 2 and 3.
Figure 5:
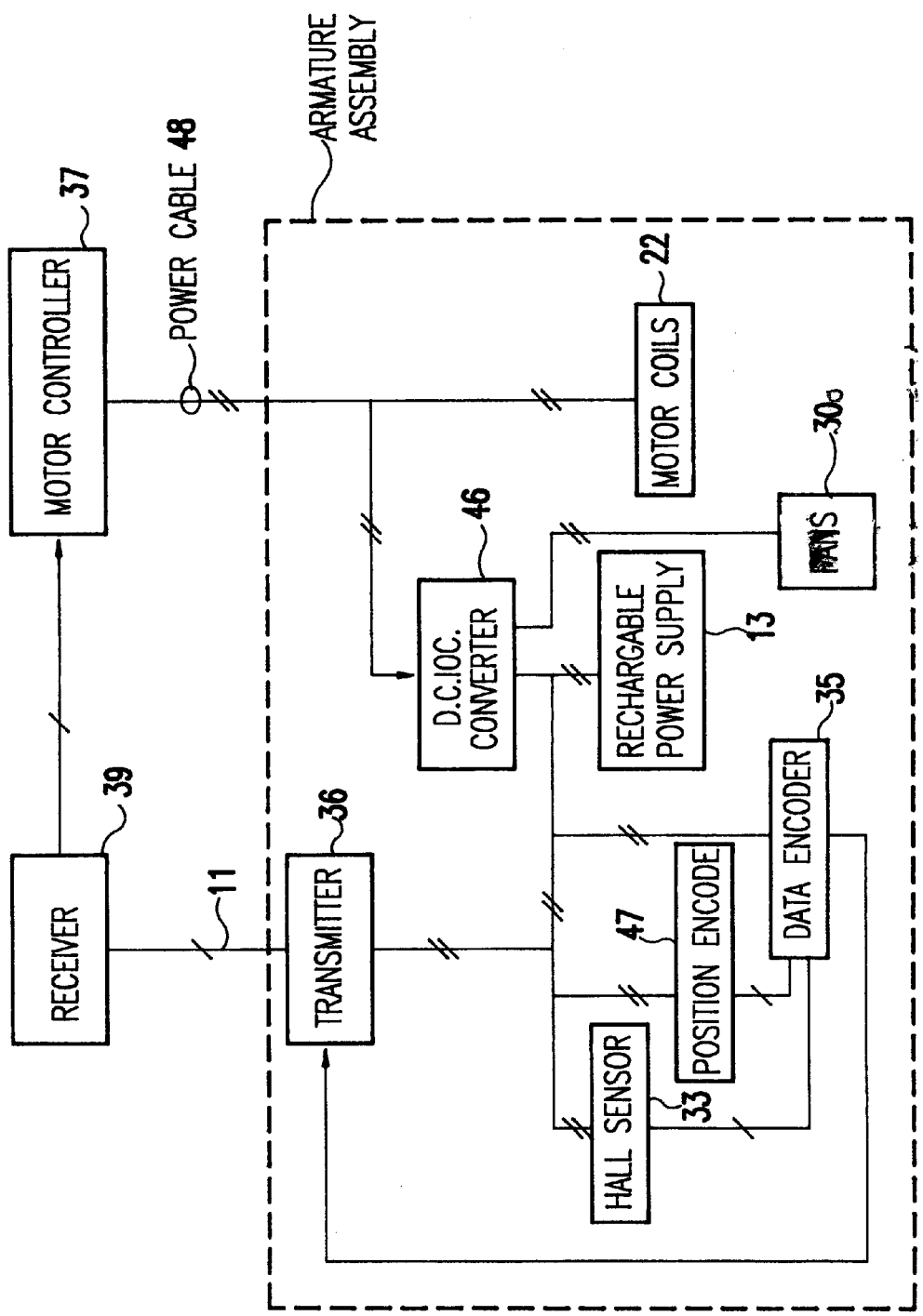
FIG. 5 is a functional block diagram showing electronic and power connections among the motor system components shown in FIGS. 1–4.

In accordance with the teachings of this invention, the armature 18 is comprised of a cast resin armature plate 20 in which armature coils 22 are embedded; for a three phase motor, typically six coils are used three of which are shown in FIG. 4, in a nonoverlapping arrangement, but, as will be appreciated by those skilled in the art, they could be disposed in an overlapping position. The cast resin armature plate is formed with a suitable thermally conductive resin. A heat sink 24, made of a suitable thermally conductive material (e.g. aluminum) is attached by a heat conductive epoxy to one edge of the cast resin armature plate 20. Preferably, the plate 20 fits snugly in a slot in the heat sink in order to provide an extensive contact area between the plate and the heat sink. Thermally conductive pins 26 help conduct heat from the armature coils 22 to the heat sink and also help secure the armature plate to the heat sink. One end of each thermally conductive pin 26 extends into the cast resin plate 20 and the other end extends into the heat sink 24. To make the armature assembly more rigid, hard plastic covers could be placed over and under the armature plate 20 and held in place by an epoxy applied through openings in the covers.

One or more fans 30 (here three fans), attached to the outboard surface of the heat sink 24, move air across the heat sink to help cool it and thereby aid in heat transfer away from the armature coils. The heat sink 24 has fins 31 to aid in heat removal by providing an additional surface area over which air passes.

Sensors 33 (e.g. Hall effect sensors), embedded in the armature plate 20, generate commutating signals indicating the position of the armature coils 22 relative to the stator permanent magnets 12. As will be appreciated by those skilled in the art, these commutating signals are used to control sequential switching of power to the armature coils. In this three-phase embodiment of the invention, there are three commutation position sensors 33 (e.g. three Hall effect sensors). An armature position encoding sensor 47 is mechanically attached to the armature assembly. The armature position encoder may be, for example, an optical encoder.

An encoder/multiplexer 35 is attached to the armature assembly, here it is attached to the heat sink 24. A wireless transmitter 36 (e.g. rf or ir) is also attached to the heat sink 24. Commutation signals from the sensors 33 and armature position signal from the armature position encoder 47 are coupled to the encoder/multiplexer 35, whose output is coupled to the transmitter 36. Obviously, the encoder/multiplexer function and the transmitter function can be combined in a single electronic package. The transmitter 36 transmits the commutating signals over a wireless, serial communication link 11 to a receiver 39, whose output is coupled to a motor controller 37. The armature position transducer 47 signals, which indicate the position of the armature, are multiplexed with the commutating signals, and transmitted over the serial channel 11 to the motor controller 37, where they are demultiplexed, decoded, and used to control the power to the armature coils.

U.S. Pat. No. 5,317,245 discloses the basic two wire concept for brushless motors. In the two wire concept, the commutation switches and the commutation switch logic are physically located with the motor armature. The power to operate the switches and logic are derived from the same two wires that provide the drive current to the armature coils. With linear control, a high frequency signal on the two wires provides power for the commutation switch and switch controls. With certain pulse width modulation control systems, an auxiliary source for the commutating switch and controls is not necessary. Copending application Ser. No. 08/742,821 discloses a two-wire, brushless, linear motor with armature commutation switches and control logic mounted on the moving armature assembly and powered by the same two wires that power armature coils. Here, a rechargeable supply is provided for the conditions when power is not available from the two wires.

While the two-wire brushless motor is advantageous in that it reduces the umbilical to two wires, the two-wire system provides a stepped (e.g. six step) commutated armature voltage, which is less desirable than a sinusoidally commutated waveform. The six step commutation produces a force ripple while driving the armature coils with a sine wave produces a constant force. However, with a sinusoidally commutated armature current, the armature control amplifiers are advantageously located remotely from the armature.

The invention is applicable to two-wire six step systems three-wire, six step systems and to three wire, sinusoidal systems. With the three wire, three phase sinusoidal armature drive, or two or three wire six step armature drive, power for the fans can be taken from the armature power wires via a d.c. convertor 46 mounted on the armature assembly. The output of the convertor 46 can also be used to power the commutation electronics; i.e. armature position electronics, the encoder/multiplexer electronics, and the transmitter. With a linear power control and certain pulse width modulated (PWM) controls, a rechargeable power source 13, such as a rechargeable battery, can be used to supply power to these components when the armature is at rest, as taught in the 08/742,821 application. Alternatively, a high frequency signal can be used to provide power to the electronic components as taught in the 5,317,245 patent. As more fully explained in the 5,312,245 patent, with a balanced PWM control, power is available on the armature power wires to power the electronic components (and fans if desired) even when the armature is at rest and the rechargeable battery or other auxiliary source is not needed to provide power.

In operation, the transmitter 36 transmits the armature position commutating signals from sensors 33 and the armature position signals from a transducer 47 (e.g. an optical position encoder) serially over a single, preferably wireless, communication channel 11 to the motor controller 37. An umbilical 42 comprised of three power wires connects the controller 37 to the armature coils 22. The power wires 42 are also connected to the input of the d.c. to d.c. convertor 46, secured to heat sink 24. The output of convertor 46 provides power to the fans 30, to the commutating sensors 33, to the armature position sensor 47, the encoder/multiplex 35 the transmitter 36, and a rechargeable power supply 48.

Here it will be appreciated fans 30 do not need to be powered when the armature is at rest since no heat is generated by the armature. However, the position sensors, the multiplexer and the transmitter should be powered when the armature is at rest. Power for the electronics can be supplied by a rechargeable battery, as disclosed in the aforementioned 08/742,821 application, or as disclosed in patent 5,317,245, depending on the control method employed, or if desired over a separate pair of wires.

Figure 6:
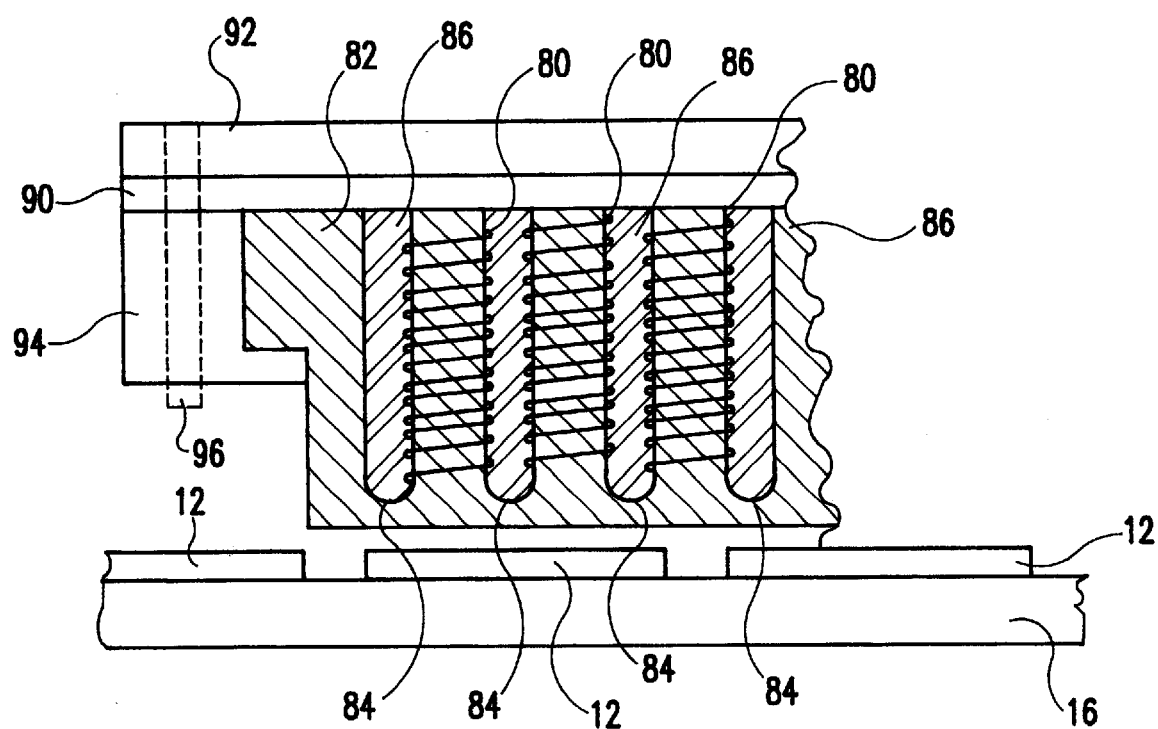
FIG. 6 is a fragmentary side view, with parts in section, of an alternate armature design for use in the practice of the invention.

Referring now to FIG. 6, it shows an alternate design of an armature assembly, which may be used in place of the armature plate 20 in the linear motor shown and described in connection with FIGS. 1–5. In this alternative design, armature coils 80 are wound on a laminated, magnetic structure 82, such as structure of steel laminates. The gap between adjacent armature coils is bridged by a thin piece 84 of the magnetic structure 82 (e.g. the bridge 84 is on the order of the thickness of a single laminate, about 0.05 inches). This thin bridge 84 becomes magnetically saturated, providing a sufficiently high magnetic reluctance in the path between adjacent coils so as not to substantially reduce the interaction between the coils 80 and the permanent magnets 22. At the same time, the magnetic bridge 84 smooths the magnetic transition between adjacent coils 80, thereby reducing or eliminating motor clogging without the need to skew the lamination structure or the permanent magnets.

The coils are encapsulated with a thermally conductive compound 86. This encapsulating compound 86 is in intimate thermal contact with the coils 80 and a carriage structure comprised of a back iron plate 90 and a heat sink 92 (for example, an aluminum plate). A fan 30 (not shown in FIG. 6) may be attached to the heat sink 92. Here it will be appreciated the encapsulating compound provides a large thermal cross-section between the coils 80 and the armature carriage. A keeper 94 and bolts 96 secure together the heat sink, back iron plate, and the coil carrying lamination structure.

Figure 7A:
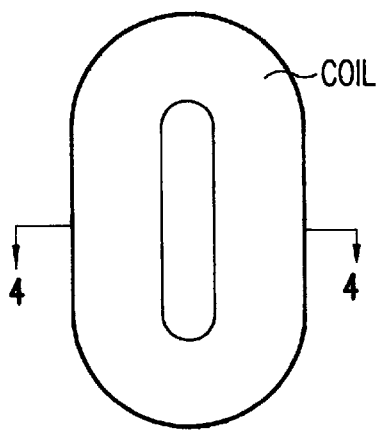
FIG. 7A as a plan view of an armature coil.
Figure 7B:
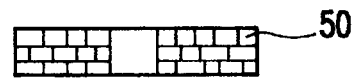
FIG. 7B is a sectional view of an armature coil wound with rectangular wires.

Referring now to FIGS. 7A and 7B, each armature coil 22 is preferably formed from rectangular or square wires 50, for example copper wires. Rectangular or square wire allows the coils to be formed with less air space between adjacent conductors than can be formed with round conductors, which contact one another only at their tangent points. The air spaces in conventional coils, using round wire, impede the transfer of heat from the interior of the coil, particularly where the coils are embedded in a cast resin armature plate. Further, square or rectangular wire coils with the same number of turns as a round wire coil will have a lower resistance, resulting in a lower heat generation for the same current or a larger force for the same amount of heat generated. Preferably, the rectangular wire is coated with a thin, heat sensitive, insulating coating so that the wires bond together when the coil is heated (e.g. in an oven), forming a coil component that can be handled easily.

Figure 8:
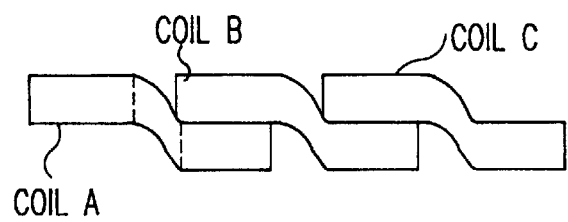
FIG. 8 is a side view of an overlapping, three-coil armature subassembly.
Figure 9:
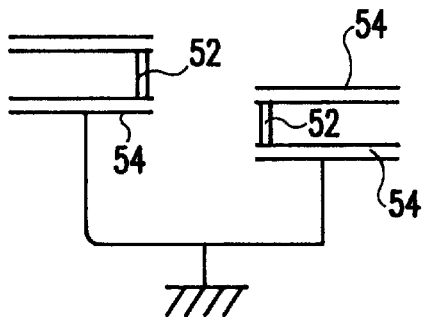
FIG. 9 is a schematic side view of a form for forming the coils shown in FIG. 7.
Figure 10:
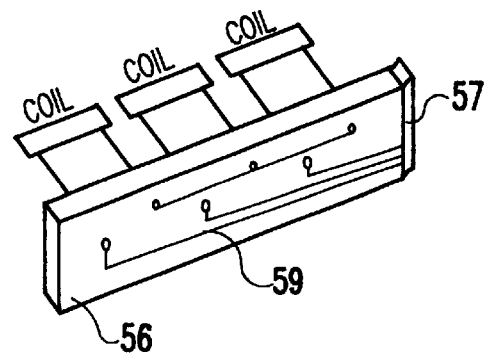
FIG. 10 is a schematic view of a printed wiring board used to interconnect the armature coils and to connect the armature coils to the external power source.

Referring to FIGS. 9 and 10, with the square or rectangular wire, each layer of the coil can be wound around pins 52 acting in combination with parallel plates 54. In a three-phase armature, adjacent coils can be overlapped, as shown in FIG. 7, and the winding fixture has parallel plates positioned such that the opposite sides of the coil are in different, but parallel, planes as shown in FIG. 8.

Multiple coils (overlapped or not overlapped) can be interconnected by a printed wiring board 56, as shown in FIG. 9. The board is preferably embedded in the cast resin armature plate 20, and has a connector 57 through which a connection is made to the external power source (controller 37) via the umbilical wires 42 and the regulator 46.

As previously explained, the commutating sensor outputs and the armature position sensor output are multiplexed and transmitted on a serial data communications channel, preferably a wireless channel. Using a wireless, multiplexed channel for the armature commutation data and the armature position data allows the motor to operate with a two-wire umbilical and a six-step trapezoidal drive, or a three-wire umbilical and a sinusoidal drive. If a hardwired multiplexed channel were used to transmit the commutation data and position data, it would add only two wires to the umbilical.

In the preferred wireless embodiment of the invention, the transmitter 36 carried by the armature transmits to a stationary receiver 39, whose output is coupled to the motor controller 37. Radio frequency (rf) and infrared (ir) are two examples of transmitter/receiver systems that may be used in the practice of the invention.

Figure 11:
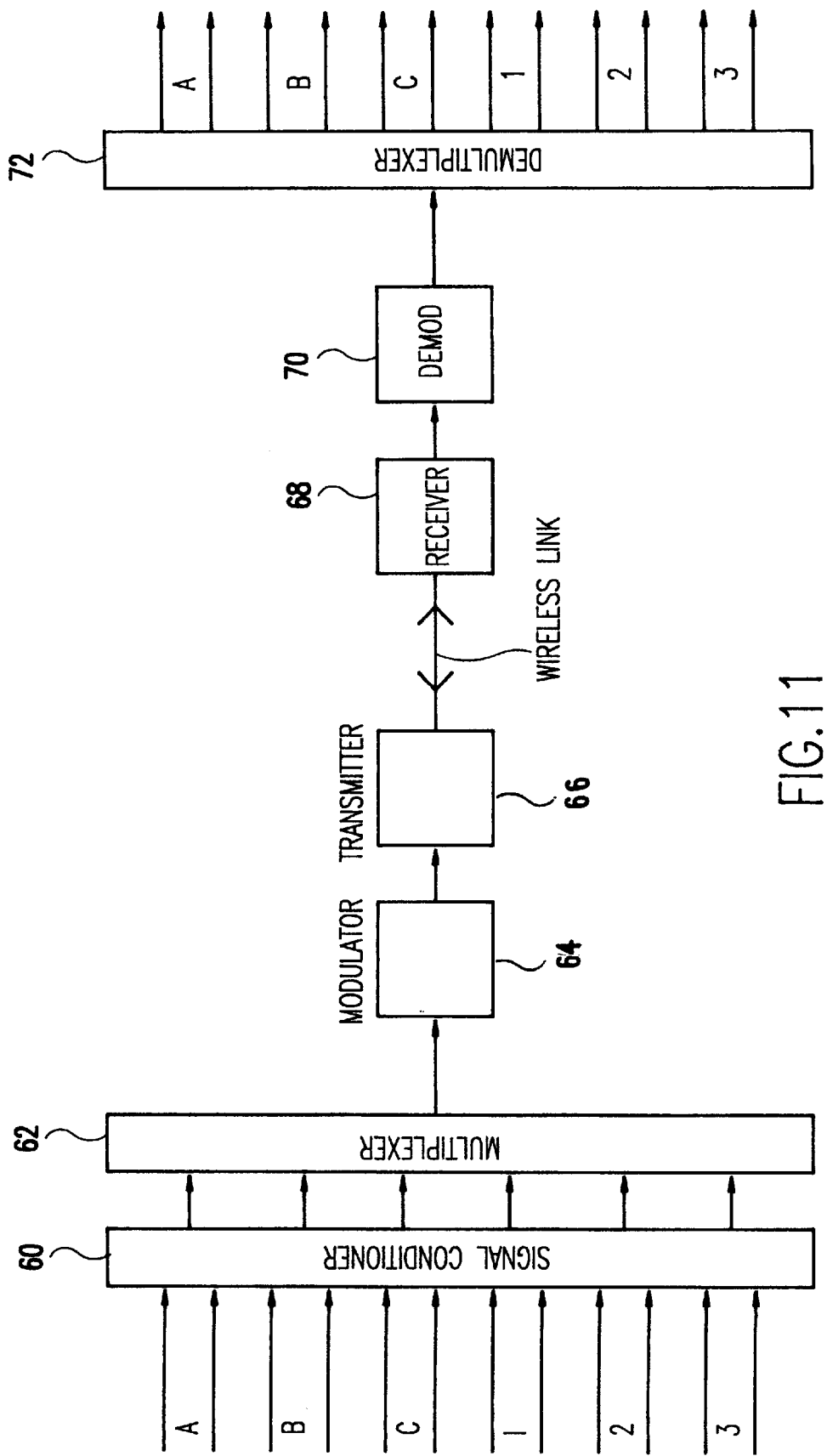
FIG. 11 is a block diagram of a single channel system for transmitting armature commutating and position data to the motor controller.

FIG. 11 illustrates one specific example of a wireless transmitter/receiver system to transmit commutating and position information to the motor controller. Referring to FIG. 10, three commutation inputs A, B and C from sensors 33, carried by six wires (i.e. three two wire pairs) are coupled as inputs to a signal conditioner 60, which here serves as a first stage of the multiplexer. Also coupled as inputs to conditioner 60 are three inputs (1, 2 and 3) from the armature position sensor 47 (i.e. six wires three, two wire pairs). The conditioner 60 converts the binary, high or low value inputs to one or the other of two predetermined voltage levels, for example by periodic sampling or by edge detection of the inputs. The outputs of the conditioner 60 are coupled as inputs to a parallel-to-serial multiplexer 62. Suitable prior art parallel-to-serial multiplexing systems include time division multiplexing, where the binary values are periodically transmitted in frames with each signal assigned a time slot in the frame. A modulator 64 modulates a carrier (e.g. radio frequency or infrared) with the output of the multiplexer 62 and transmitter 36 transmits the multiplexed commutation and position signals as serial data stream to a receiver 39. A demodulator 70 demodulates the received signal and couples it to a demultiplexer 72, which converts the serial binary values to parallel outputs A, B, and C corresponding to the inputs A, B, and C, respectively, and to parallel outputs 1, 2, and 3 corresponding to inputs 1, 2, and 3. These outputs are coupled to the motor controller 37.

While the invention has been described in terms of a single preferred embodiment, those skilled in the art will recognize that the invention can be practiced with modification within the spirit and scope of the appended claims.

We claim:

1. A brushless, linear motor comprising in combination:

a stator;

an armature;

said stator including a series of longitudinally disposed permanent magnets arranged to interact with a current flowing in an armature coil carried by said armature;

said armature mounted for longitudinal movement relative to said stator;

said armature including a plurality of armature coils embedded in non-magnetic base plate with a heat sink secured to said base plate;

fan means secured for movement with said heat sink; and wires connected between a stationary controlled motor power source and said armature providing power both to said armature coils and said fan means.

2. A brushless, linear motor as in claim 1 wherein said fan is attached to said heat sink.

3. A brushless, linear motor as in claim 1 wherein said heat sink is secured to an edge of said base plate, and thermally conducting pins extend in said base plate and into said heat sink.

4. A brushless, linear motor as in claim 1 wherein the number of said wires is three.

5. A brushless, linear motor as in claim 1 wherein the number of said wires is two.

6. A brushless, linear motor comprising in combination:

a stator;

an armature;

said stator including a series of longitudinally disposed permanent magnets arranged to interact with a current flowing in an armature coil carried by said armature;

said armature mounted for longitudinal movement relative to said stator;

said armature including a plurality of armature coils embedded in non-magnetic base plate with a heat sink secured to said base plate; and fan means secured for movement with said heat sink.

7. A brushless, linear motor comprising in combination:

a stator;

an armature;

said stator including a series of longitudinally disposed permanent magnets arranged to interact with a current flowing in an armature coil carried by said armature;

said armature mounted for longitudinal movement relative to said stator;

said armature including a plurality of armature coils embedded in non-magnetic base plate with a heat sink secured to said base plate;

a plurality of sensor means for generating armature commutating signals to indicate the position of said armature coils relative to said permanent magnets;

wires respectively coupling each of said plurality of sensor means to an input of a multiplexing means; means for generating an armature position signal;

wires connecting said means for generating an armature position signal to said multiplexing means;

said multiplexing means converting inputs to said multiplexer to an output serial data stream; and means to transmit said serial data stream to a motor controller for controlling said current flowing in said armature coils.

8. A brushless, linear motor as in claim 7 wherein said means to transmit is a wireless transmitter.

9. A brushless, linear motor comprising in combination:

a stator;

an armature;

said stator including a series of longitudinally disposed permanent magnets arranged to interact with a current flowing in an armature coil carried by said armature;

said armature mounted for longitudinal movement relative to said stator;

said armature including a plurality of armature coils embedded in non-magnetic base plate with a heat sink secured to said base plate;

a fan secured for movement with said heat sink;

a plurality of wires connected to said armature coils for conducting current to said armature coils and also for conducting current to said fan;

means for generating a plurality of armature commutating signals to indicate the position of said armature coils relative to said permanent magnets, said armature commutation signals carried by a plurality of wire pairs to a multiplexing means;

means for generating an armature position signal, said armature position signal carried by a wire pair to said multiplexing means;

said multiplexing means converting parallel inputs to said multiplexer on said wire pairs to a serial data stream; and means to transmit said serial data stream to a motor controller for controlling said current flowing in said armature coils.

10. A brushless, linear motor as in claim 9 wherein said means to transmit is a wireless transmitter.

11. A brushless, linear motor comprising in combination:

a stator;

an armature;

said stator including a series of longitudinally disposed permanent magnets arranged to interact with a current flowing in a plurality of armature coils carried by said armature;

said armature mounted for longitudinal movement relative to said stator;

said armature including a plurality of armature coils embedded in non-magnetic base plate with a heat sink secured to said base plate;

a fan secured to said base plate in proximity of said heat sink;

a plurality of wires connected to said armature coils for conducting current to said armature coils and also for conducting current to said fan;

means for generating a plurality of armature commutating signals to indicate the position of said armature coils relative to said permanent magnets, said armature commutation signals carried by a plurality of wire pairs to a multiplexing means;

means for generating an armature position signal, said armature position signal carried by a wire pair to said multiplexing means;

said multiplexing means converting parallel inputs to said multiplexer on said wire pairs to a serial data stream;

means to transmit said serial data stream to a motor controller for controlling said current flowing in said armature coils;

said plurality of coils formed of rectangular wires; and a printed wiring board interconnecting said plurality of coils and connecting said plurality of coils to a power source external to said armature plate.

12. A brushless, linear motor comprising in combination:

a stator;

an armature;

said stator including a series of longitudinally disposed permanent magnets arranged to interact with a current flowing in a plurality of armature coils carried by said armature;

said armature mounted for longitudinal movement relative to said stator;

an armature comprising a laminated structure including a plurality of cores on respective ones of which there are a plurality of coils;

said laminated structure further including a thin bridge between adjacent coils positioned at the end of said coils adjacent the air gap between said armature and said permanent magnets;

a thermally conductive material encapsulating said coils and providing a thermally conductive path from said coils to a heat sink located adjacent said coils on the side opposite said air gap.

13. A brushless, linear motor as in claim 12 further including fan means secured for movement with said heat sink.

14. A brushless, linear motor comprising in combination:

a stator;

an armature;

said stator including a series of longitudinally disposed permanent magnets arranged to interact with a current flowing in an armature coil carried by said armature;

said armature mounted for longitudinal movement relative to said stator;

said armature including a plurality of armature coils with a heat sink secured for movement with said armature coils; and fan means secured for movement with said heat sink.

15. A brushless linear motor as in claim 14 wherein each of said armature coils is formed of rectangular wires embedded in a cast resin plate.

16. A brushless linear motor as in claim 15 wherein the rectangular wires are square.

17. A brushless linear motor as in claim 14 wherein said plurality of armature coils are formed of rectangular wires embedded in a cast resin plate and a printed wiring board interconnecting said plurality of coils and connecting said plurality of coils to a power source external to said armature plate.

* * * * *